May 14, 1940. K. PETERSEN 2,200,677
METHOD FOR TREATING HOUSEHOLD AND TOWN REFUSE AND THE LIKE WASTE MATERIALS
Filed Sept. 11, 1937 3 Sheets-Sheet 1
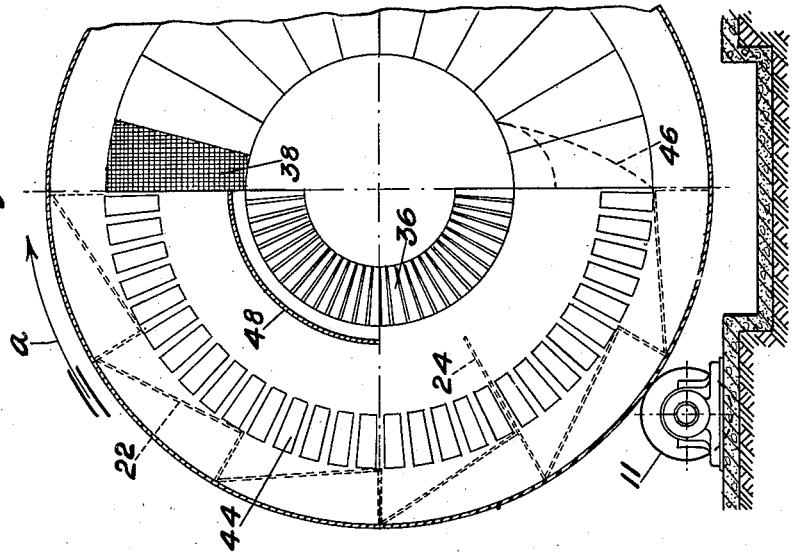
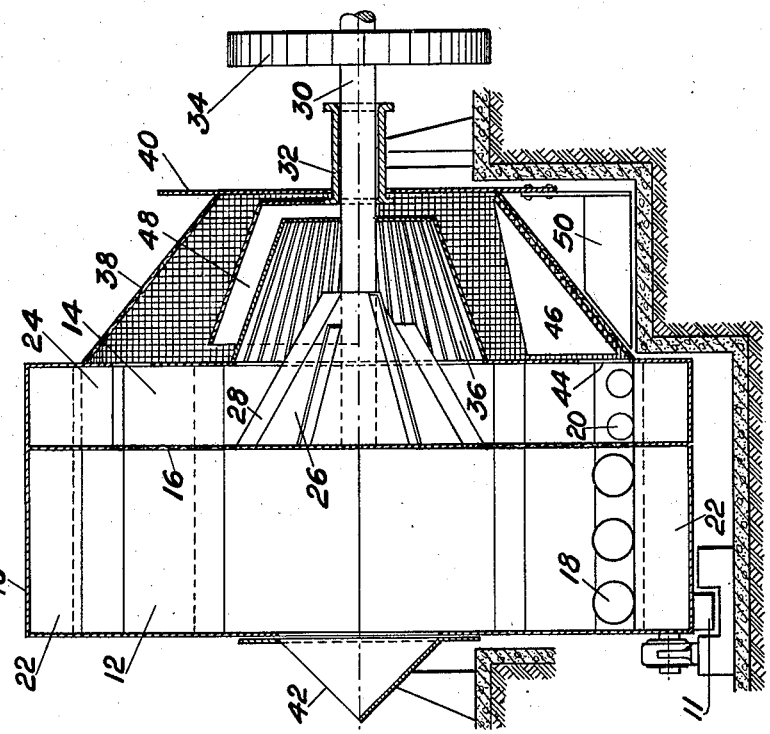
Inventor:
Kai Petersen,
By *Spear, Donaldson & Hall* Attys.

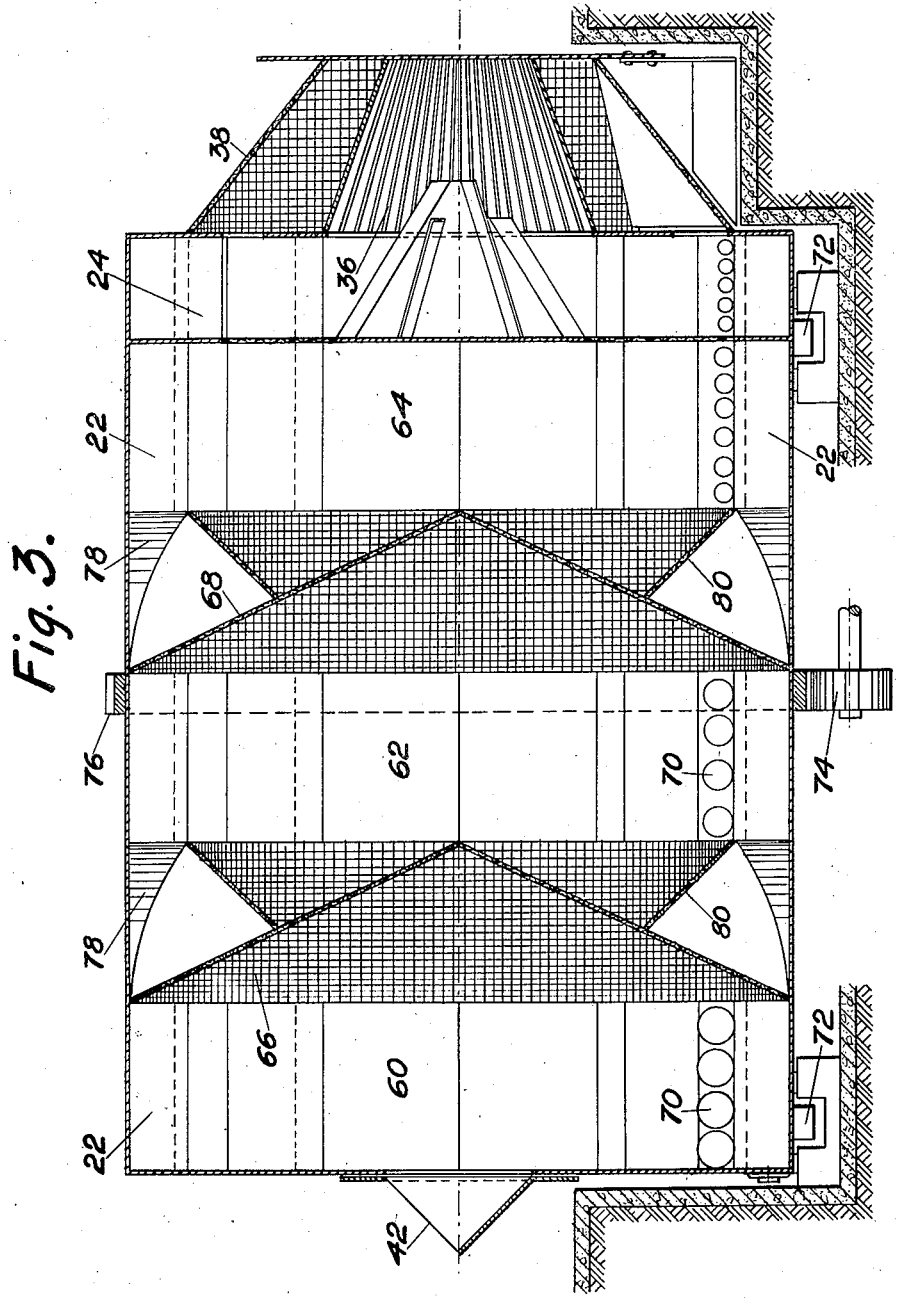

Patented May 14, 1940

2,200,677

UNITED STATES PATENT OFFICE 2,200,677

METHOD FOR TREATING HOUSEHOLD AND TOWN REFUSE AND THE LIKE WASTE MATERIALS

Kai Petersen, Soborg, near Copenhagen, Denmark

Application September 11, 1937, Serial No. 163,476
In Denmark September 16, 1936

4 Claims. (Cl. 83—94)

The present invention relates to improvements in the art of treating garbage and the like waste materials.

The object of the invention is to provide a new and useful method for treating garbage and the like waste materials which method presents essential advantages both in hygienic and economic respect in comparison with the methods previously suggested. Another object of the invention is to convert garbage and the like waste materials into a new product forming a uniform and gritty mass and being adapted for use as fertilizer or soil improving agent. A further object of the invention is to improve the existing and future refuse dumps both in hygienic and economic respect. Still another object of the invention is to make garbage and the like waste materials better suited for incineration. A still further object of the invention is to provide a new and useful apparatus for carrying out the method of the invention.

Experiments have shown that by turning over and mixing of the refuse a considerable increase of its specific gravity is obtained by a sort of self-compression action. Thus, if waste material is placed into a movably mounted container and the latter is caused to describe a rotating or oscillating movement a consolidation of the material and a consequent increase of its specific gravity is obtained, the numerous cavities of the waste material will be filled with the smaller size material present, whilst moisture present in certain of the materials will be transferred from one point or substance to another point or substance. In both cases a considerable reduction of volume is effected. It has for instance been found that a reduction in volume of 30% is obtained by treating ordinary garbage for one quarter of an hour in a mixing drum rotating at a speed of 15 revolutions per minute.

If the treatment be continued for a longer period in the rotary container a surprising additional reduction in volume of the treated waste material will be observed, and if the treated material is more closely examined it will be found that a grinding action has taken place. Thus without taking any positive measures for producing a grinding action, such as for example by using grinding bodies or providing grinding surfaces or the like, a grinding of the waste material is effected merely by turning over and mixing the material. Or in other words the latter is found to be self-grinding.

The method of the invention is based upon the observations referred to above and consists in turning over and intermixing garbage and the like waste materials in a revolving compartment thereby effecting a grinding of the said materials and removing the ground materials from the said compartment by screening.

Another embodiment of the method of the invention consists in turning over and intermixing garbage and the like waste materials in a revolving compartment thereby effecting a grinding of the said materials, promoting the grinding action by means of loose grinding bodies and removing the ground materials from the said compartment by screening.

Still another embodiment of the method of the invention consists in turning over and intermixing the materials in a revolving compartment thereby effecting a grinding of the said materials transferring the ground materials to a screening surface surrounding at least a part of the said compartment, advancing the ground materials on the said surface thereby removing the materials able to pass the said screening surface and advancing the balance of the ground materials for further treatment.

In carrying out the method of the invention use may be made of generally known devices comprising a substantially horizontally disposed rotatable container having one or more compartments and provided with means for screening the material under treatment.

An apparatus being particularly adapted for carrying out the method and forming a part of the present invention comprises a rotatable container having at least one grinding chamber at least a portion of the circumferential walls of the said chamber being provided with apertures, and fine screens surrounding at least a portion of the said circumferential walls and having an alternately active screening surface advancing the material on the said surface in the longitudinal direction of the said container.

Further characteristic features of the invention will appear from the following description with reference to the accompanying drawings which illustrate partly diagrammatically and by way of example various embodiments of apparatus for carrying the same into practical effect and in which:

Figure 1 shows a longitudinal section of one embodiment,

Figure 2 is a cross-sectional view of the same, the right-side of the view and the left-hand side showing sections in different planes, respectively, Figure 3 is a longitudinal section of a second embodiment of the apparatus and Figure 4 is a longitudinal section of a further embodiment of the apparatus.

Figure 4:
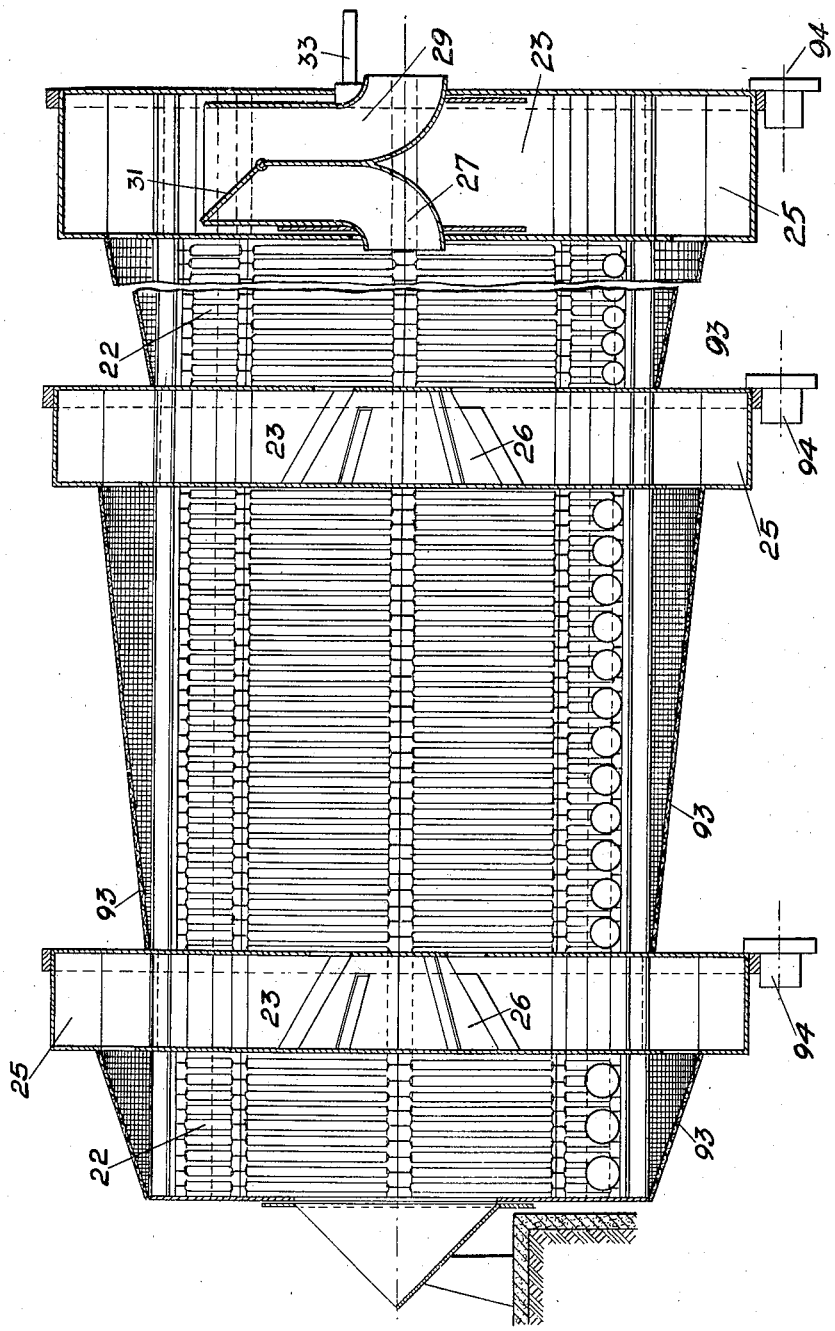

The apparatus shown in Figures 1 and 2 comprises a cylindrical drum 10 provided with a stationary hopper 42 and rotatably supported on rollers 11. The drum is divided into two chambers 12 and 14 by a perforated partition wall 16. These chambers contain loose grinding bodies 18 and 20, respectively, of different size. The grinding bodies may be ball-shaped or have any other desired form. At the peripheral wall of the said chambers inclined surfaces are provided, for instance stepped surfaces 22 formed of sheet metal like the teeth of a saw as shown in dotted lines in Figure 2. (For clearness' sake the grinding bodies throughout the drawings are shown as situated at the uppermost edge of the steps just before they slide down along the inclined surfaces.) In the chamber 14 extensions or projections 24 forming blades are provided at some, for instance three of the steps.

At the side of the partition wall 16 facing toward the chamber 14 there is secured a guiding member 26 provided on its surface with guiding ribs 28, alternately long and short. Shaft 30 rigidly attached to the member 26 and extending through the right end of the apparatus, is supported in a bearing 32 and carries a worm gear or a toothed wheel 34 serving as driving means for the apparatus. The member 26 projects into a frusto-conical extension of the chamber 14, the conical wall of which being formed from a plurality of grate-bars 36 which extend in the direction of the generatrices of the cones. A discharge screen 38 is arranged around said extension said screen being substantially conical in shape, being for instance formed by a plurality of perforated or net-like plates laid on rods as indicated in Figure 2. The screen 38 is closed by an end plate 40 projecting somewhat beyond the screen to protect the driving mechanism against the material passing through the screen. Over the uppermost part of the conical surface formed by the bars 36 a guard plate 48 is arranged, preventing non-screened material on the screen 38 from falling back into the chamber 14. A plate or plates 50 are carried by the plate 40. A plurality of apertures 44 is provided in the end bottom of the apparatus, said bottom forming a coarse grate and at the internal side of the screen 38 a plurality of curved guiding surfaces 46 is arranged serving to distribute the material slowly over the entire screening surface.

The garbage to be treated is admitted to the apparatus through the stationary hopper 42 in such an amount as to maintain a suitable degree of filling of the chamber 12, a relatively large amount of garbage being simultaneously treated. During the rotation of the apparatus the garbage supplied is subjected to a turning over, mixing and coarse grinding action in the said chamber the grinding bodies 18 promoting the said grinding action. The stepped surfaces 22 raise the garbage and the grinding bodies for a certain distance whereupon these roll or slide down the inclined surfaces or steps 22 thereby further promoting the grinding action.

The material which has attained a sufficient degree of fineness passes through the apertures of the partition 16 into the chamber 14 and is here subjected to a finer grinding in a similar way as in the chamber 12. In the chamber 14 the projections 24 raise the material and the grinding bodies 20 to such a level that when falling both hit the member 26 and are carried by the ribs 28 of the latter to the bars 36 which pick up the bodies 20 and convey them back again to the chamber 14 together with material being too coarse so as to pass through the spaces of the bars 36, while the main part of the garbage falls between the bars on to the screen 38. Thus, the bars 36 serve partly to prevent the falling bodies 20 from reaching the screen 38 whereby the latter would otherwise be damaged and partly to form a coarse pre-screen for the screen 38 so that the latter is not loaded with material which is much too coarse to pass it.

The material which has passed through the bars 36 is distributed over the entire screening surface of the screen 38 by means of the guiding surfaces 46. The sufficiently fine material passes through the screen 38 whereas the balance of the material is returned to the chamber 14 through the apertures 44 for further grinding.

The fine material leaving the apparatus through the screen 38 is discharged from the pit beneath the said screen by means of the plate 50, while the residue remaining in the chambers 12 and 14 and mainly consisting of cans and other iron parts and the like ungrindable or difficultly grindable components, such as rags, is discharged at suitable times. The character and the amount of the said residue depend on the duration of the treatment in the apparatus.

By the treatment described above the bulky and heterogeneous garbage is converted into a uniform loose and gritty mass having an increased specific gravity and in which the moisture as well as the various components are substantially uniformly distributed. This mass will not give rise to fires when deposited on the refuse dumps or be blown about by the wind. Moreover, it will not attract the various rodents, insects and other animals which otherwise infest such dumps. Furthermore, a subsequent natural or artificial conversion will take place without any substantially perceivable odour being given off and in an easier and more rapid manner than before the treatment according to the invention so that if the treated material be deposited on refuse dumps the areas thus occupied can be used much sooner for cultivation or habitation purposes. In cases where the treatment of the invention is carried out before the garbage is carried to the dumps the costs of transport to the same will be substantially reduced, and besides the levelling work, if any, on the dumps will be facilitated. A further and very essential advantage resides therein that if refuse dumps are to be employed the treatment of the invention makes it possible to dispose of much smaller areas than hitherto. Finally, the product obtained by the treatment of the invention is also better adapted for incineration since it possesses a rather uniform calorific power according to the uniform distribution of combustible matter and since it is possible in an easy and cheap way to separate the inorganic components of the treated garbage before incineration, for instance by means of a pneumatic separation.

Generally, the garbage is treated in its original state, i. e., as it is lying at an existing dump or as it is collected for deposit on such dump. However, it falls within the scope of the invention to separate large ungrindable or difficultly grindable components, such as big stones, iron and other metallic waste materials, worn-out pneumatic tires and the like prior to the treatment according to the invention.

The degree of fineness of the product obtained by the treatment of the invention is preferably such that the coarser particles of the product will pass a sieve having a mesh width of about 0.4–0.6 inch.

In the embodiment shown in Figure 3 the compartment corresponding to the chamber 12 of Figure 1 is divided into three chambers 60, 62 and 64 mutually separated by conical screens 66 and 68, the first of which is coarser than the latter. The size of the grinding bodies 70 correspondingly decreases from one chamber to the next in direction of the discharge end of the apparatus. The apparatus is supported on two sets of rollers 72 and is driven by a pinion 74 meshing with a series of sticks or a toothed ring 76 secured externally on the drum of the apparatus. The chambers have stepped surfaces 22 as mentioned above, but these do not extend completely to the adjacent partition wall of the preceding chamber but perpendicularly opposite the apex of the conical screen thereby obviating the risk of the material being carried back through the screen in question. The material that has passed a screen is conducted by curved guiding surfaces 78 on to the next stepped surface 22. To prevent the grinding bodies from leaving the stepped surfaces 22, conical surfaces 80 with coarse perforations are placed over the guiding surfaces 78. In other respects the apparatus is constructed mainly with reference to the embodiment according to Figure 1.

The apparatus shown in Figure 4 is also divided into three chambers, but here the stepped surfaces are formed as grates 22, whereas the individual chambers are surrounded by conical screens 93. Furthermore, elevating wheels 23 having blades or shovels 25 and a delivering device 26 are provided between the chambers. The wheel arranged at the outlet end of the apparatus is provided with a particular delivering device arranged stationary on a rod 33 and having a swingable valve flap 31, a back feeding nozzle 27 and a discharge nozzle 29. The apparatus is mounted on rollers 94 and is driven by any suitable driving means not shown.

The operation of the various chambers of the apparatus is substantially similar to that of the right-hand part of the chamber 14 of the apparatus shown in Figure 1. During the rotation of the apparatus the garbage is ground in the chambers and the components being sufficiently fine to pass the grates 22 are delivered to the inclined screens 93 the active screening surface thereof transferring the material being too coarse so as to pass the screens to the elevating wheels 23. By means of the blades 25 and the delivering devices 26 the material is discharged into the following chamber for further treatment. The material which cannot pass the conical screen 93 surrounding the chamber nearest to the discharge end of the apparatus is delivered to the elevating device arranged at the end of the said chamber. By means of the blades 25 arranged in the said elevating device the material is delivered to the back feeding nozzle 27 or the discharge nozzle 29 according to the position of the valve flap 31. By suitably adjusting the spaces between the grate bars 22, the size of the various chambers and the size and number of the grinding bodies a continuous separation of difficultly grindable or ungrindable components of the garbage may be provided.

The apparatus shown in Figures 1—4 is merely illustrating examples of devices adapted for carrying out the method of the invention. Other devices in which a turning over, mixing and grinding action with simultaneous screening is effected may also be used. Furthermore, it should be noted that the method of the invention is not restricted to the use of loose grinding bodies. For instance, the apparatus shown on the drawings may be used without grinding bodies, utilizing only the self-grinding properties of the garbage.

Having thus fully described my invention I claim as new and desire to secure by Letters Patent:

1. A method of treating garbage containing a substantial quantity of relatively solid components and the like refuse which comprises supplying the garbage to a rotatably mounted container, consolidating the garbage and transferring moisture of the relatively moist components of the garbage to the relatively dry components thereof by rotating the container, effecting a grinding of the garbage through the action of the relatively solid components by further rotating the container, continuing the said mode of operation until the garbage is converted into a loose and gritty mass, in which the moisture as well as the various components are substantially uniformly distributed, and a residue consisting of the difficultly grindable and the non-grindable components, and simultaneously subjecting the ground matter to a screening to prevent the formation of a doughy and sticky non-grindable mass and to separate the uniform loose and gritty mass from the residue.

2. In a method of treating garbage containing a substantial quantity of relatively solid components and the like refuse a treating step which comprises supplying a large amount of garbage to a rotatable compartment, consolidating the garbage and transferring moisture of the relatively moist components of the garbage to the relatively dry components thereof by rotating the said compartment, effecting a grinding of the garbage through the action of the relatively solid components by further rotating the compartment, simultaneously subjecting the ground garbage to a coarse screening perpendicular to the axis of rotation of the compartment to prevent the formation of a doughy and sticky non-grindable mass, and separating the fine and sufficiently ground components forming a uniform loose and gritty mass by a further and finer screening.

3. A method of treating garbage and the like refuse which comprises supplying the garbage to a rotatably mounted container, consolidating the garbage and transferring moisture of the relatively moist components of the garbage to the relatively dry components thereof by rotating the container, effecting a grinding of the garbage by further rotating the container, supporting the grinding by means of foreign grinding bodies, continuing the said mode of operation until the garbage is converted into a loose and gritty mass, in which the moisture as well as the various components are substantially uniformly distributed, and a residue consisting of the difficultly grindable and the non-grindable components, and simultaneously subjecting the ground matter to a screening to prevent the formation of a doughy and sticky non-grindable mass and to separate the uniform loose and gritty mass from the residue.

4. In a method of treating garbage and the like refuse a treating step which comprises supplying a large amount of garbage to a rotatable compartment, consolidating the garbage and transferring moisture of the relatively moist components of the garbage to the relatively dry components thereof by rotating the said compartment, effecting a grinding of the garbage by further rotating the compartment, supporting the grinding by means of foreign grinding bodies, simultaneously subjecting the ground garbage to a coarse screening perpendicular to the axis of rotation of the compartment to prevent the formation of a doughy and sticky non-grindable mass, and separating the fine and sufficiently ground components forming a uniform loose and gritty mass by a further and finer screening.

KAI PETERSEN.